(12) United States Patent
Herman

(10) Patent No.: US 9,497,942 B2
(45) Date of Patent: Nov. 22, 2016

(54) AQUARIUM FILTRATION SYSTEM

(71) Applicant: Valerie Herman, Mesa, AZ (US)

(72) Inventor: Valerie Herman, Mesa, AZ (US)

(*) Notice: Subject to any disclaimer, the term of this patent is extended or adjusted under 35 U.S.C. 154(b) by 244 days.

(21) Appl. No.: 14/290,904

(22) Filed: May 29, 2014

(65) Prior Publication Data

US 2015/0342162 A1    Dec. 3, 2015

(51) Int. Cl.
*A01K 63/04* (2006.01)
*A01K 63/00* (2006.01)

(52) U.S. Cl.
CPC ........... *A01K 63/045* (2013.01); *A01K 63/006* (2013.01)

(58) Field of Classification Search
CPC .. A01K 63/00; A01K 63/003; A01K 63/006; A01K 63/04; A01K 63/045; A01K 63/047
See application file for complete search history.

(56) References Cited

U.S. PATENT DOCUMENTS

| | | | | |
|---|---|---|---|---|
| 3,392,836 A | * | 7/1968 | Willinger | A01K 63/047 210/167.21 |
| 3,512,646 A | * | 5/1970 | Willinger | A01K 63/047 119/245 |
| 4,077,877 A | * | 3/1978 | Orensten | A01K 63/045 210/167.22 |
| 4,093,547 A | * | 6/1978 | Sherman | A01K 63/047 210/167.27 |
| 4,236,488 A | * | 12/1980 | Olds | A01K 61/003 119/262 |
| 4,285,813 A | * | 8/1981 | Stewart | A01K 63/047 210/167.25 |
| 4,312,752 A | * | 1/1982 | Malik | A01K 63/047 210/167.22 |
| 4,481,905 A | | 11/1984 | Fonseca | |
| 4,703,720 A | | 11/1987 | Shipman et al. | |
| 6,041,740 A | | 3/2000 | Newman | |
| D435,942 S | | 1/2001 | Willinger | |
| 7,430,989 B2 | | 10/2008 | Allis | |
| 7,527,729 B2 | | 5/2009 | Wong | |
| 7,793,617 B2 | | 9/2010 | Venezia | |
| 8,361,315 B2 | | 1/2013 | Sun | |
| 2006/0000755 A1 | * | 1/2006 | Carley | A01K 63/006 210/167.23 |
| 2007/0266955 A1 | * | 11/2007 | Wong | A01K 63/006 119/253 |
| 2012/0017840 A1 | * | 1/2012 | Allis | A01K 63/045 119/261 |

FOREIGN PATENT DOCUMENTS

GB    1197332 A   *   7/1970   ........... A01K 63/047

OTHER PUBLICATIONS

Product Description—Deco-O 20L Aquarium [online], retrieved from Pet Superstore Essex website using Internet URL: http://www.petsuperstoreessex.co.uk/Designer-Aquarium-2 on May 29, 2014.

* cited by examiner

*Primary Examiner* — Kathleen Alker
(74) *Attorney, Agent, or Firm* — Morgan Law Offices, PLC

(57) ABSTRACT

An aquarium filtration system comprises an aquarium; a hollow ornament filtration device disposed adjacent to an inner bottom surface of the aquarium; and an aquarium support, capable of supporting the aquarium atop. The hollow ornament filtration device includes a main portion including a filter therein and a base including a magnetic impeller. In operation, the impeller draws a portion of water through a top opening of the main portion of the hollow ornament filtration device, through the filter, and out of at least one lateral opening of the base. The impeller is magnetically driven by magnets spun by an electric motor disposed in the aquarium support. In an embodiment, the filter is a replaceable filter cartridge including filtration media to provide mechanical and chemical filtration. Advantageously, all of the elements of the filtration system are hidden providing a more aesthetically pleasing experience.

18 Claims, 10 Drawing Sheets

AQUARIUM FILTRATION SYSTEM

BACKGROUND OF THE INVENTION

1. Field of the Invention

The present invention relates to aquarium filtration systems, and, more particularly, to an aquarium filtration system particularly well suited to cleaning fishbowls and other smaller aquariums.

2. Description of the Related Art

Many fishbowls and other smaller aquariums have no filtration at all. As a result, the fish living in these aquariums can suffer and generally do not live long. Where there is filtration, it is common to see simple, air-driven filters which are placed inside the tank. Although these internal air-driven filters are relatively inexpensive and easy to set up, they often do not provide satisfactory filtration and, as a result, the fish do not thrive. Furthermore, such filters are not always aesthetically pleasing.

Some smaller aquariums use undergravel filters which are filters placed underneath a layer of gravel. Such filters allow beneficial bacteria to colonize the gravel, so as to break down waste materials. Undergravel filters in smaller tanks will usually rely on an air pump that is external to the aquarium. However, such an undergravel filter alone will only provide mechanical filtration. As such, some undergravel filter systems also include a replaceable cartridge (which can include activated charcoal) at the end of rigid tubing, but such chemical filtration is limited and placement of the cartridge in the tubing will reduce the flow through the system thereby negatively impacting overall filtration effectiveness. Additionally, care must be taken to ensure that the gravel is regularly cleaned so that it does not become clogged and/or accumulate waste at the bottom of the tank attracting harmful bacteria. Furthermore, undergravel filtration systems tend to be loud and cause water turbulence which stresses fish.

SUMMARY OF THE INVENTION

An aquarium filtration system comprises an aquarium; a hollow ornament filtration device disposed adjacent to an inner bottom surface of the aquarium; and an aquarium support, capable of supporting the aquarium atop. The hollow ornament filtration device includes a main portion including a filter therein and a base including a magnetic impeller. In operation, the impeller draws a portion of water through a top opening of the main portion of the hollow ornament filtration device, through the filter, and out of at least one lateral opening of the base. The impeller is magnetically driven by magnets spun by an electric motor disposed in the aquarium support. In an embodiment, the filter is a replaceable filter cartridge including filtration media to provide mechanical and chemical filtration. Advantageously, all of the elements of the filtration system are hidden providing a more aesthetically pleasing experience. In an embodiment, the magnets disposed in the aquarium support are disposed on a spinning portion of an electric fan (e.g., a CPU cooling fan).

In an embodiment, the aquarium support includes an upper surface and the aquarium includes a lower surface, the upper surface of the aquarium support and the lower surface of the aquarium both substantially planar and adjacent one another when the aquarium is placed atop the aquarium support. In this embodiment, there is no physical electrical connector (e.g., a wire or cord) disposed between the aquarium support and the impeller. The aquarium support can further include heat dissipation features, such as at least one vent.

DETAILED DESCRIPTION OF THE INVENTION

Figure 1:
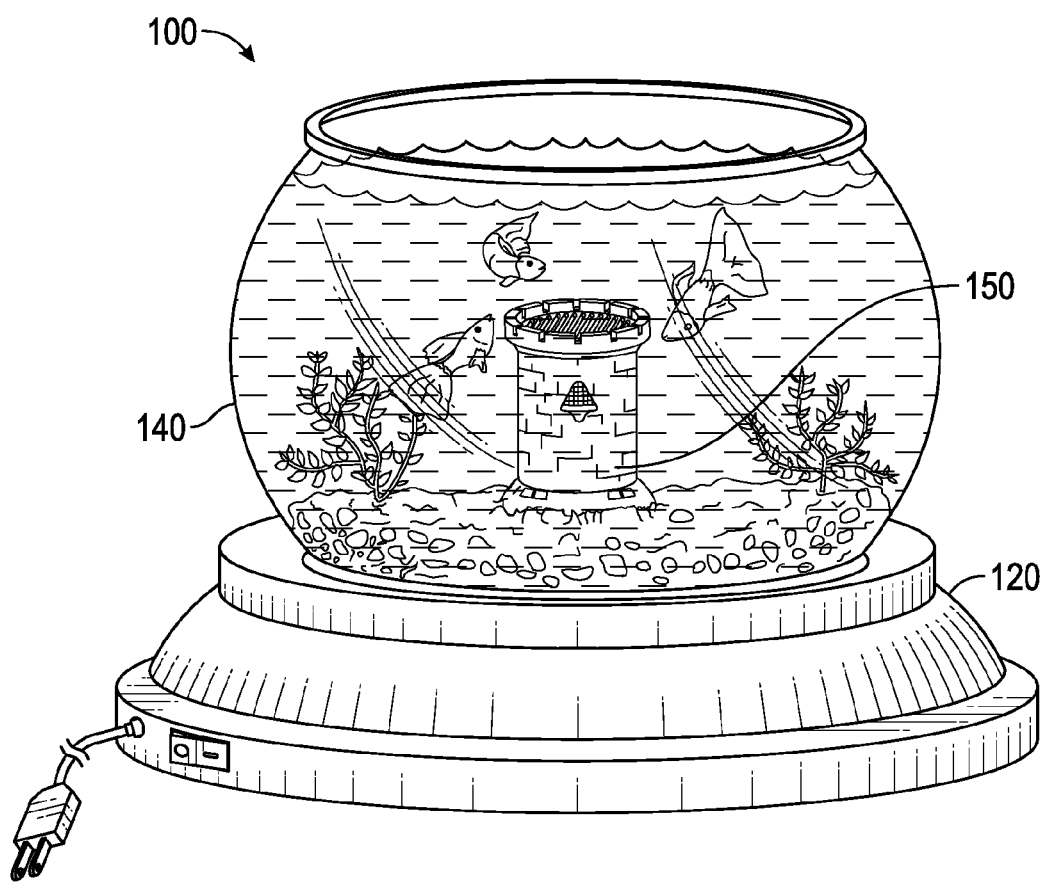
FIG. 1 illustrates an example aquarium filtration system in use, according to one embodiment.

Referring to FIG. 1, an example aquarium filtration system 100, according to an embodiment, is illustrated. As shown, the aquarium filtration system 100 includes an aquarium support 120 that supports an aquarium 140. In use, the aquarium 140 can be filled with water and live fish placed therein. In addition, aquatic plants, various decorative objects, gravel, etc., can further be placed in the aquarium 140. Although the illustrated aquarium 140 is a fishbowl having a curved lateral side see FIGS. 3 and 4, element 143, it is to be understood that the aquarium 140 could assume another shape, e.g., rectangular. In general, the aquarium filtration system 100 is most suitable for a fishbowl or other smaller aquarium though it may also suitable for certain larger aquariums as well.

Figure 2:
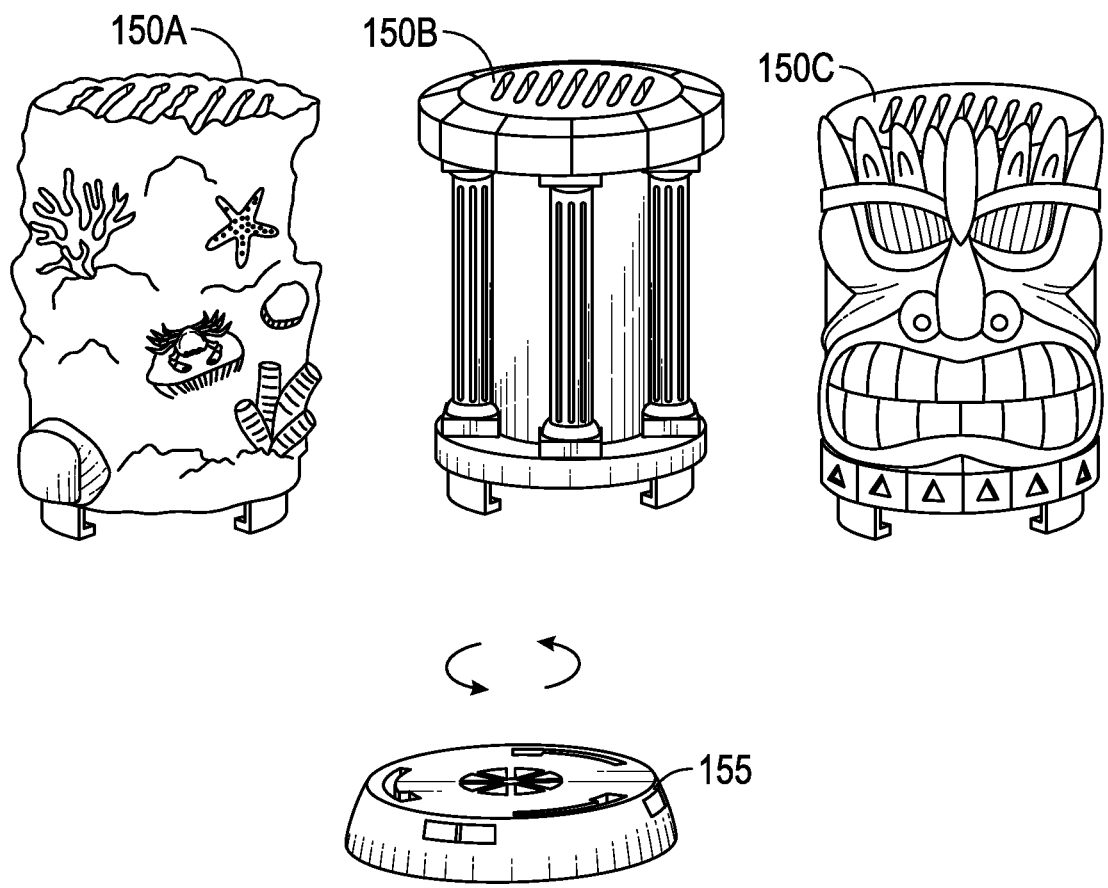
FIG. 2 illustrates various example designs for a hollow ornament filtration device useable in connection with the aquarium filtration system.

As shown, the aquarium filtration system 100 includes a hollow ornament filtration device 150 which houses the filtration mechanism. The hollow ornament filtration device 150 preferably has a decorative shape such as a castle (as shown), a marine rock, a treasure chest, a rock formation, ancient pottery, a volcano, a skull, a beer mug, an abstract design, etc. In general, the design for the hollow ornament filtration device 150 will both be aesthetically pleasing and capable of hiding the components of the filtration mechanism from view. FIG. 2 illustrates various other example ornamental designs 150A-C suitable for the hollow ornament filtration device 150, each of which is inter-lockable with a base 155.

Figure 3:
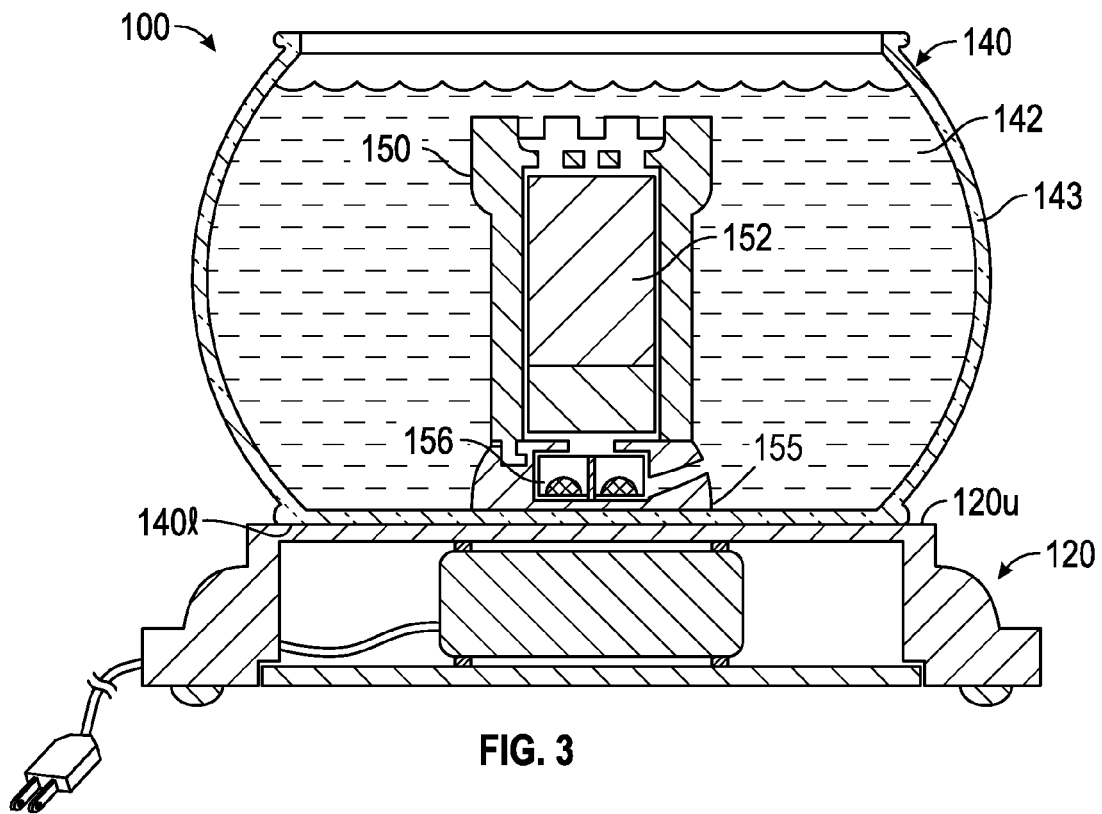
FIG. 3 illustrates a cutaway side view of the aquarium filtration system.

FIG. 3 illustrates a cutaway side view of the aquarium filtration system 100, according to an embodiment of the invention. As shown, the hollow ornament filtration device 150 houses a filter 152 and includes the attachable base 155 where a magnetic impeller 156 resides. In the illustrated embodiment, the aquarium support 120 includes an upper surface 120u and the aquarium 140 includes a lower surface 140l, the upper surface 120u of the aquarium support 120 and the lower surface 140l of the aquarium 140 both substantially planar and adjacent one another when the aquarium 140 is placed atop the aquarium support 120. In this embodiment, there is no physical electrical connector (e.g., a wire or electrical cord) disposed between the aquarium support 120 and the magnetic impeller 156.

Figure 4:
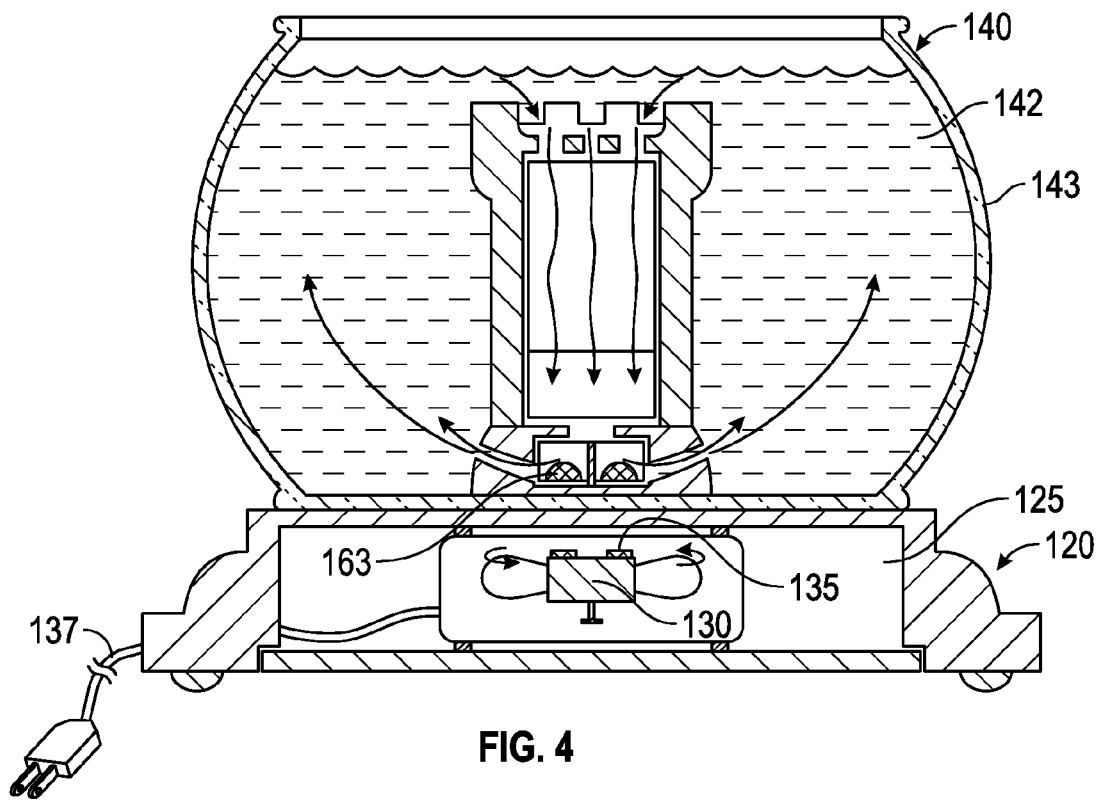
FIG. 4 illustrates a cutaway side view of the aquarium filtration system showing the water flow from operation thereof.

FIG. 4 illustrates the cutaway side view of the aquarium filtration system 100 showing flow of water 142. In this view, the aquarium support 120 is shown to include an interior portion 125 which houses an electric motor 130. The electric motor 130 can be a low voltage DC powered motor electrically supplied via an electric cord 137 which can be plugged into a standard electrical outlet. In this embodiment, it is to be understood that an AC/DC converter would have to be used to convert the current from the outlet to DC. In another embodiment, the cord 137 is a cable having a connector attachable to an external AC/DC adapter (rather than the electrical plug shown). In yet another embodiment, the cord 137 can be a cable including a USB connector allowing connection to a computer (or other USB compatible device capable of electrically supplying the electric motor 130).

To magnetically drive the magnetic impeller 156, a plurality of magnets 135 are disposed on a spinning portion of the electric motor 130. For example, the electric motor can be a CPU fan and the magnets 135 can be permanent magnets placed so that the magnets 135 spin as the fan blades spin. The magnetic impeller 156 can include a plurality of permanent magnets 163 which are driven by the spinning magnets 135. The magnets 135, 163 will be arranged such that there is magnetic attraction between the magnets 135 and the magnets 163. This can be done by having each of poles of the magnets 135 pointing in the opposite magnetic direction from the poles of the magnets 163.

Figure 5:
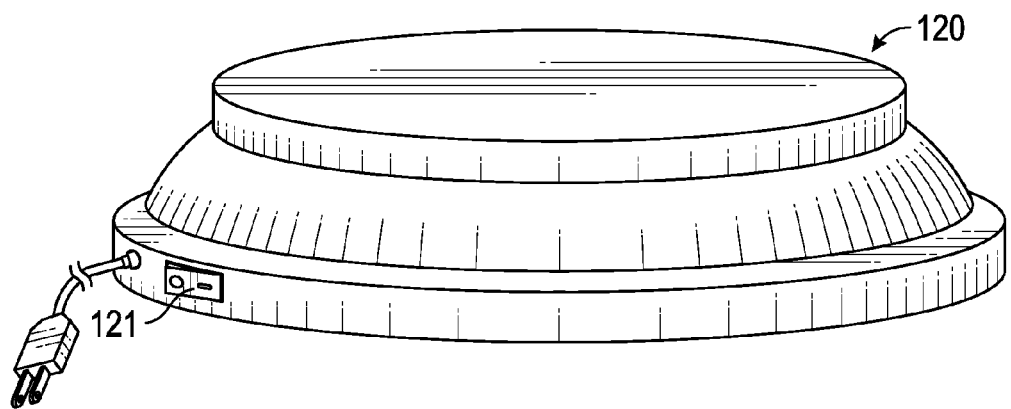
FIG. 5 illustrates an example aquarium support capable of supporting an aquarium useable with the aquarium filtration system.
Figure 6:
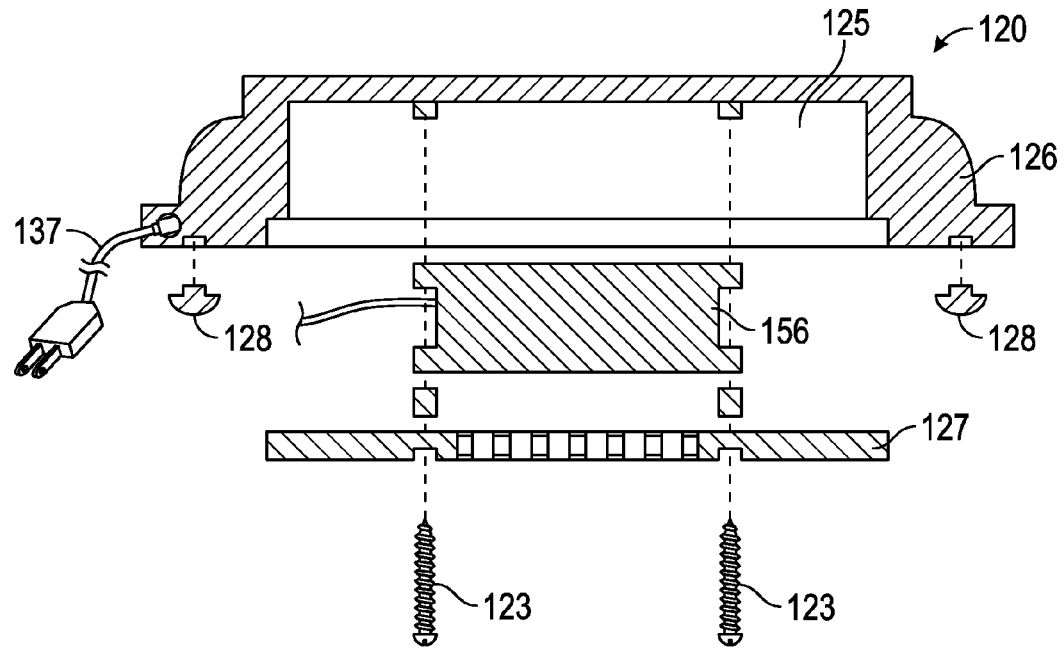
FIG. 6 illustrates an exploded cutaway view of the aquarium support.

FIG. 5 is a perspective view of the aquarium support 120. FIG. 6 shows an exploded cutaway view of the aquarium support 120. As illustrated, the aquarium support 120 includes a housing 126 which can be made of a suitable rigid material that does not disturb the operation of the magnets, such as an appropriate plastic (e.g., polypropylene, polyethylene, acrylonitrile butadiene styrene (ABS), polyurethane). As noted, the housing 126 includes therein an interior portion 125 which houses the electric motor 130. It is to be understood that the electric motor 130 would be appropriately mounted or otherwise secured (e.g., glued, soldered) therein.

Figure 7:
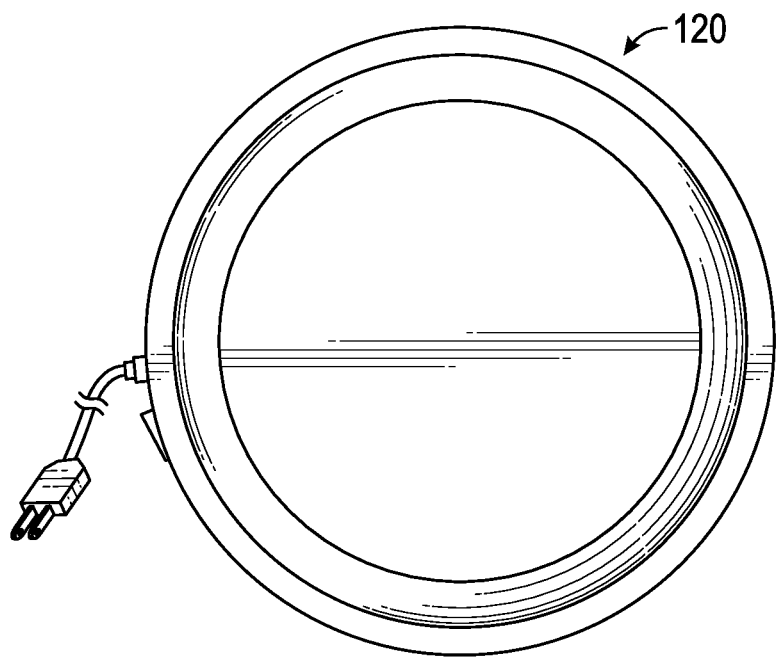
FIGS. 7 and 8 illustrate top and bottom views of the aquarium support, respectively.
Figure 8:
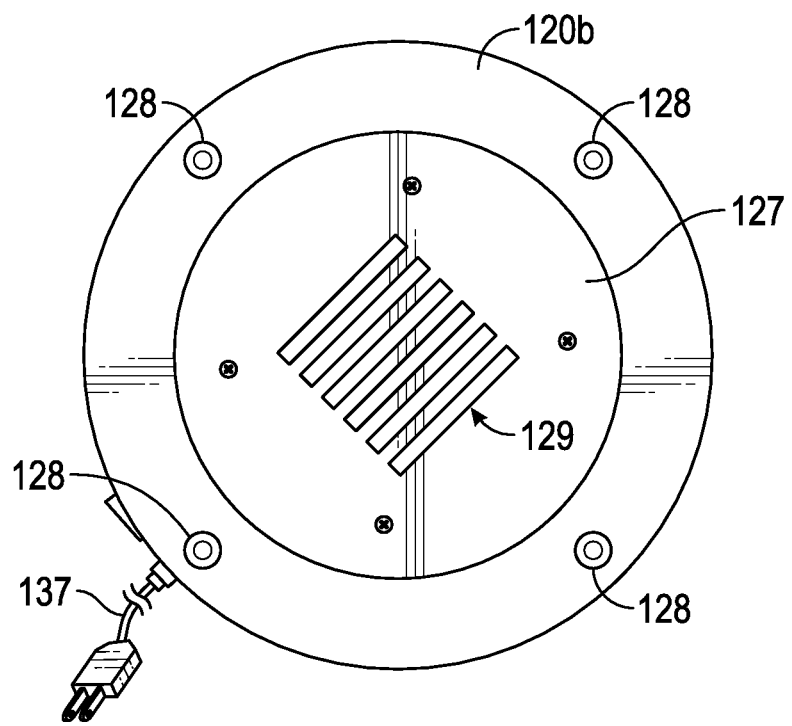

FIGS. 7 and 8 illustrate top and bottom views of the aquarium support 120, respectively. As shown in FIG. 8, at the bottom 120b of the aquarium support 120, a plurality of legs or bumps 128 can be attached (or provided integrally) to slightly raise the aquarium support 120 from a surface where the aquarium support 120 is placed, so as to allow ventilation of air from the interior portion 125 through at least one ventilation opening 129, such as is shown in FIG. 6, and to prevent slipping and noise/vibration translation to the surface.

As mentioned, the electric motor 130 can be a DC powered motor with a spinning portion capable of supporting the spinning magnets 135. In the illustrated embodiment, the electric motor 130 includes a CPU cooling fan which cools itself and the magnets 135 are attached to a spinning portion of the CPU cooling fan (near the center portion of the blades). The electric motor 130 with the spinning magnets 135 attached thereto can be placed into the interior portion of the housing 126 and a plate 127 can be attached to the bottom of the housing 126 (using, for example, screws 123). It is to be understood that there can be other suitable designs other than the example shown. For instance, the plate 127 could instead be friction fitted or screwed into the bottom of the housing 126. As another example, the aquarium support 120 can be sealed. In this case, there would be no opening in the housing to remove or service the electric motor 130. In still other embodiments, the electric motor 130 can be supplied by one or more batteries, and the interior portion 125 can include a battery compartment. In yet another embodiment, the electric motor can be solar powered by at least one external solar cell. In these cases, the cord 137 would not be needed. Additionally, the electric motor 130 can be a single-speed or multi-speed motor. A switch 121 can be included to operate the electric motor 130. In the case that the electric motor is multi-speed, the switch 121 can be a multi-speed switch.

Figure 9:
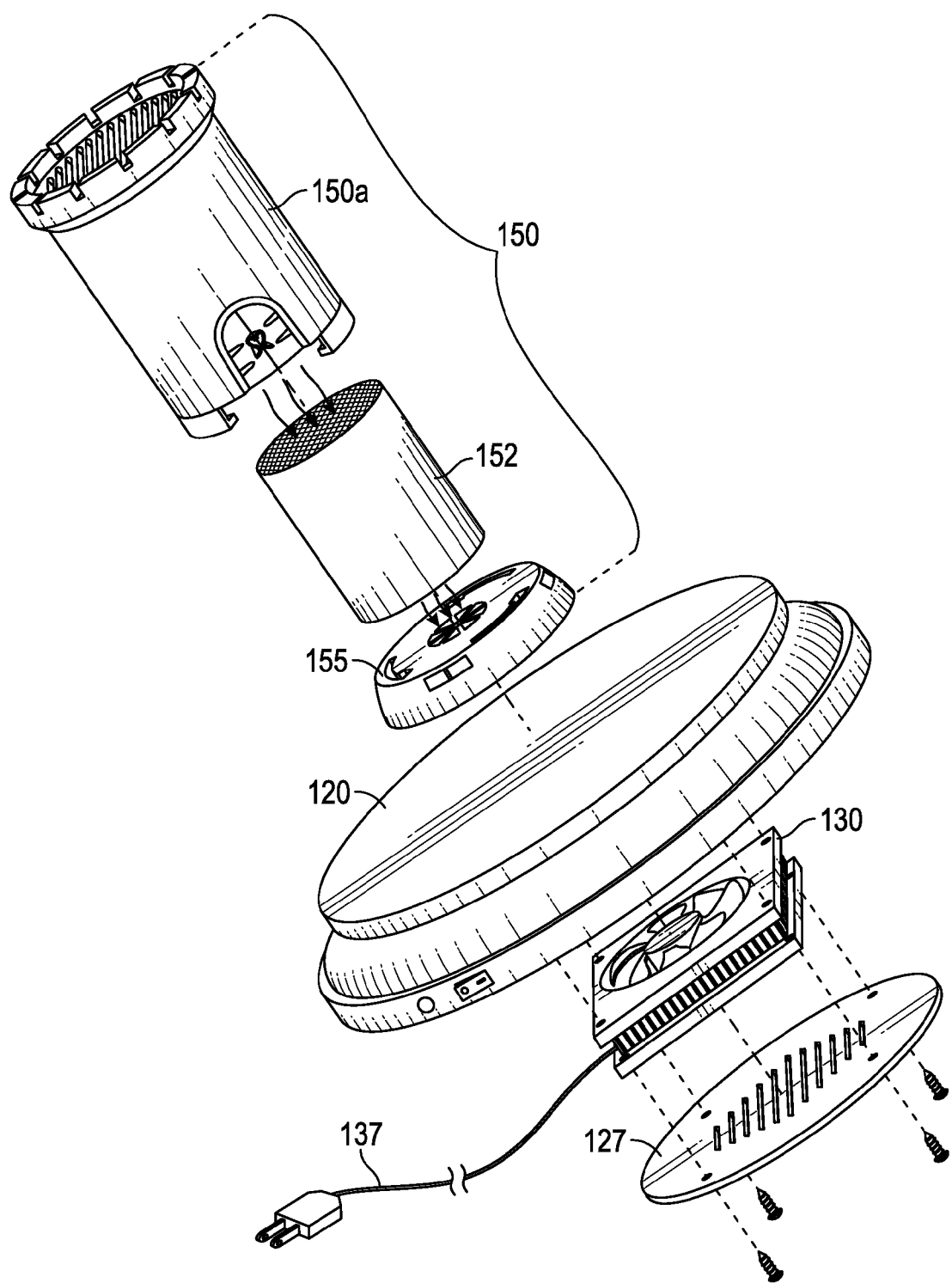
FIG. 9 illustrates an exploded view of the aquarium filtration system (shown without the aquarium)

FIG. 9 illustrates an exploded view of the aquarium filtration system 100 (shown without the aquarium 140). As shown the hollow ornament filtration device 150 includes a main portion 150a holding the filter 152 therein inter-lockable with the base 155 housing the magnetic impeller 156, the aquarium support 120 housing the electric motor 130 (with the spinning magnets 135) and the plate 127.

Figure 10:
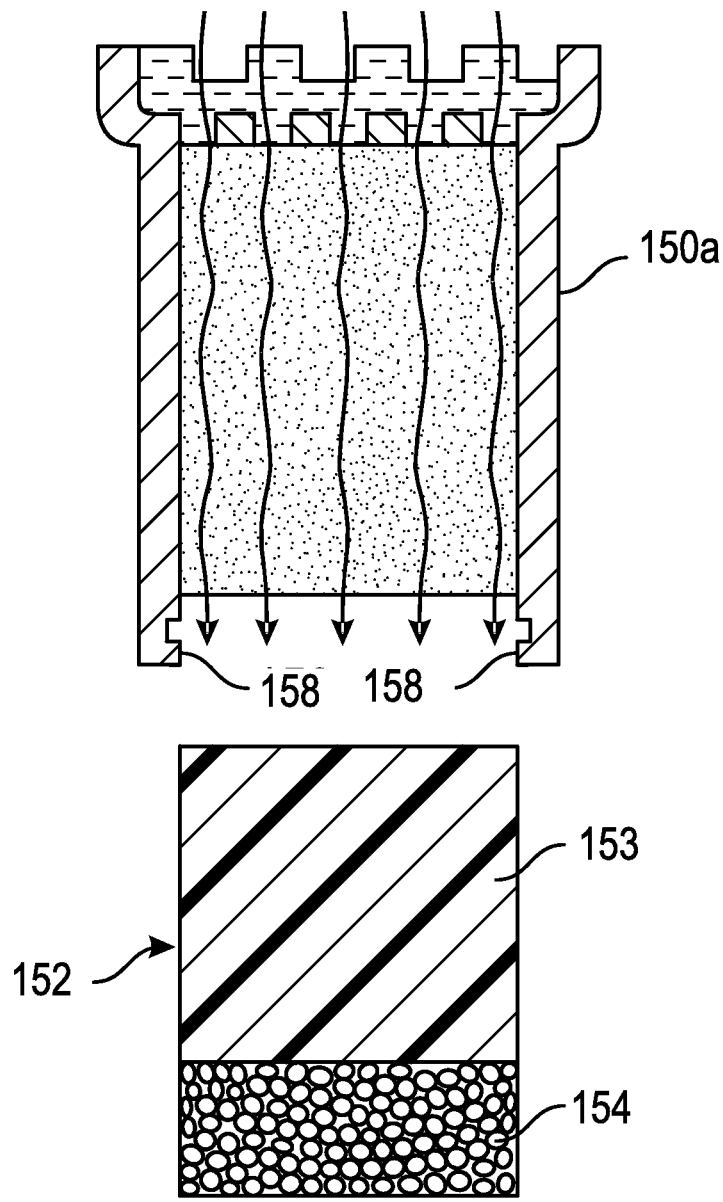
FIG. 10 illustrates a filter cartridge fitting into a hollow ornament filtration device useable with the aquarium filtration system.

FIG. 10 illustrates an embodiment in which the filter 152 includes a first filter medium 153 and second filter medium 154. In an embodiment, the filter 152 is a replaceable cartridge filter comprising a first filter element 153 including filter floss for filtering particulate matter such as detritus and a second filter element 154 including activated charcoal for filtering finer particles and to provide chemical filtration. In other embodiments, the filter 152 can include additional filter media such as zeolite crystals to aid in ammonia removal and overall filter performance.

Figure 11:
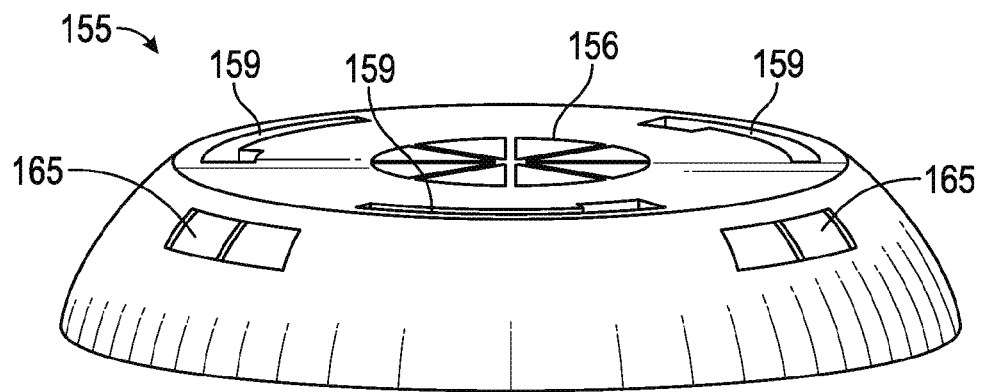
FIG. 11 illustrates a base portion of the hollow ornament filtration device.

FIG. 11 illustrates a perspective view of the base 155. The base 155 includes a plurality of female slots 159. The hollow ornament filtration device 150 can be attached to the base portion 155 by interlocking male protrusions 158 (shown in FIG. 10) with the corresponding female slots 159. Also shown in FIG. 10 are a plurality of outflow openings 165 arranged around the base portion 155 to allow water to flow out from the base portion 155 of the hollow ornament filtration device 150.

Figure 12:
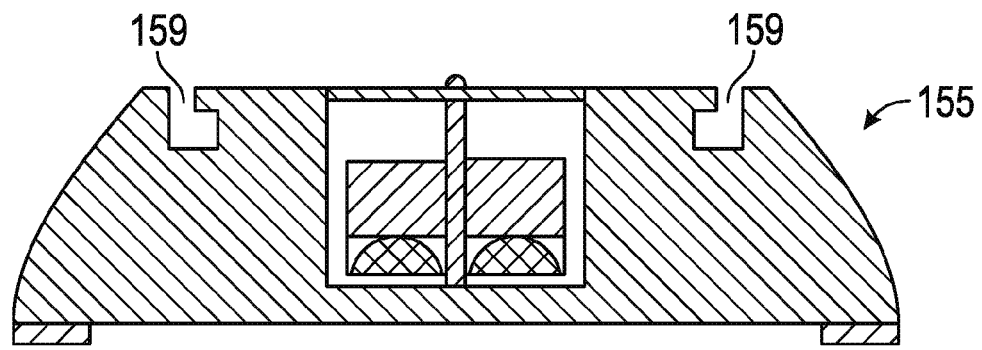
FIG. 12 illustrates a first cutaway side view of the base of the hollow ornament filtration device.

FIG. 12 illustrates a cutaway side view of the base 155, showing the female slots 159 from a different perspective.

Figure 13:
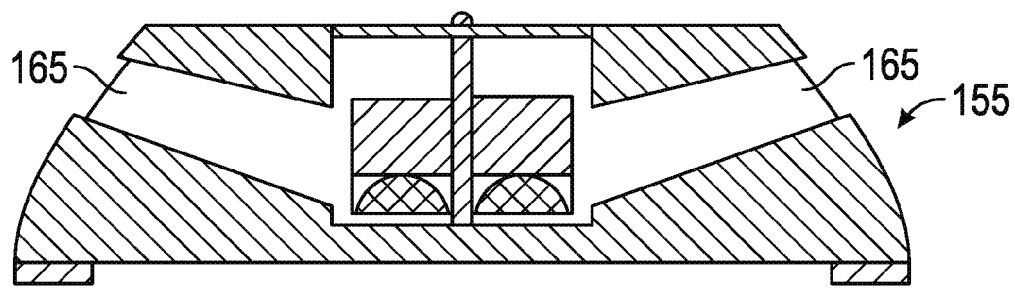
FIG. 13 illustrates a second cutaway side view of the base of the hollow ornament filtration device.

FIG. 13 illustrates a cutaway side view of the base 155, showing the outflow openings 165 from yet another perspective. Notably, the structure shown facilitates water flow downwardly from the impeller and through the outflow openings 165. Referring again to FIG. 4, in operation, water is drawn downwardly through the filter 152 (as shown by the arrows in the filter), through the magnetic impeller 156, and out the outflow openings 165. The water flowing from the outflow openings 165 is filtered water. Advantageously, the flow of water also provides excellent water oxygenation since oxygen-rich water nearest the water line is drawn into the filter 152. Additionally, and notably, the outflow openings 165 are upwardly curved so as to facilitate flow of the water so as to create an abundance of clean and oxygenated water throughout the entire aquarium 120.

Figure 14:
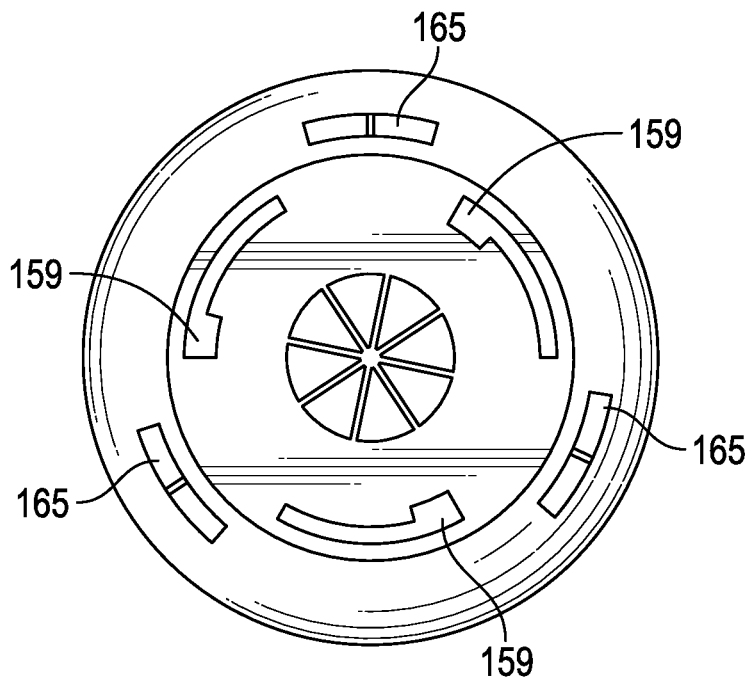
FIG. 14 illustrates a top view of the base of the hollow ornament filtration device.

FIG. 14 illustrates a top plan view of the base portion 155, providing another perspective.

Figure 15:
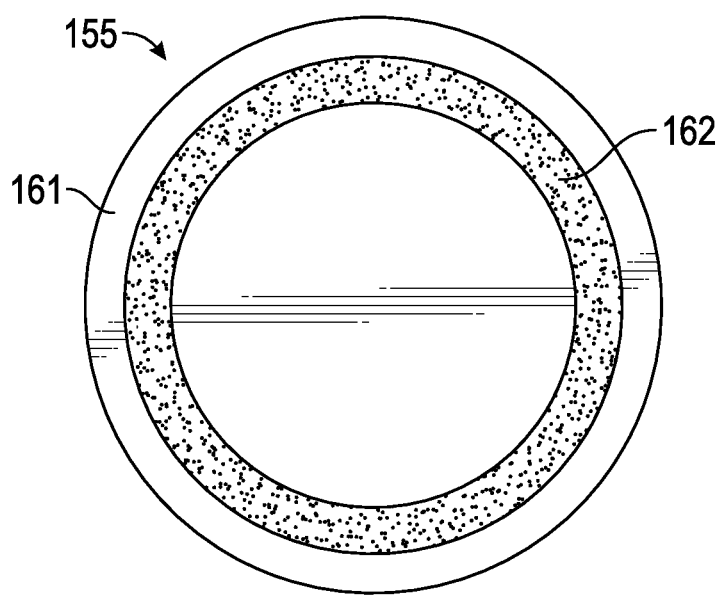
FIG. 15 illustrates a bottom view of the base of the hollow ornament filtration device.

FIG. 15 illustrates a bottom view of the base 155. As shown, the base 155 includes a bottom surface 161 that can be substantially planar (flat) and an adhesive 162. The adhesive 162 can be any adhesive with sufficient bonding strength and water resistance. In an embodiment, the adhesive is a pressure-sensitive adhesive which is applied by the end user. In this case, the filtration system 100 can be provided as a kit (with or without the aquarium 140) and assembled by the end user, including application of a pressure-sensitive adhesive to the bottom of the aquarium 140. In other embodiments, the base 155 is adhered to the bottom of the aquarium 140 during manufacture. In still other embodiments, the bottom surface 161 will not include the adhesive 161 and the hollow ornament filtration device 150 will simply be placed at the bottom of the aquarium 140 or embedded in substrate (e.g., gravel, glass beads).

Figure 16:
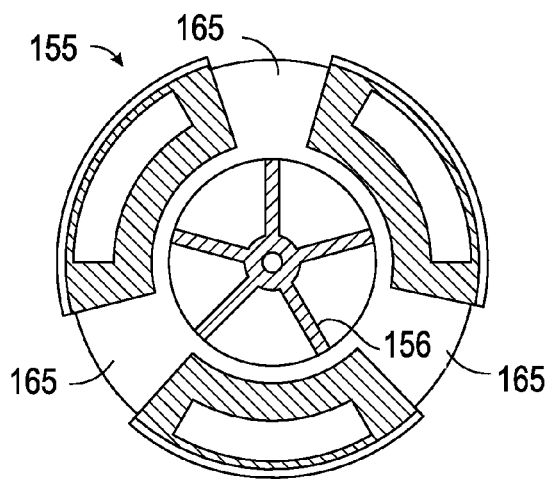
FIG. 16 illustrates a cross-sectional top view of the base of the hollow ornament filtration device.

FIG. 16 illustrates a cross-sectional top view of the base 155, providing another perspective.

Figure 17:
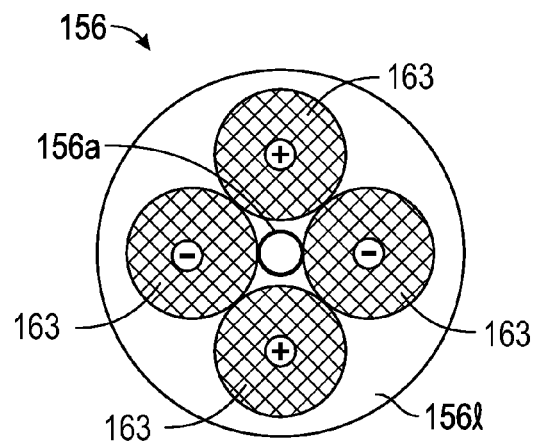
FIG. 17 illustrates a bottom view of the magnetic impeller.

FIG. 17 illustrates a bottom view of the magnetic impeller 156. As shown, a plurality of the permanent magnets 163 are adhered or fastened to a lower surface 156*l* of the magnetic impeller 156. In operation, the magnets 163 are magnetically driven by the spinning magnets 135 rotated by the electric motor 130 disposed in the interior portion 125 of the aquarium support 120.

Figure 18:
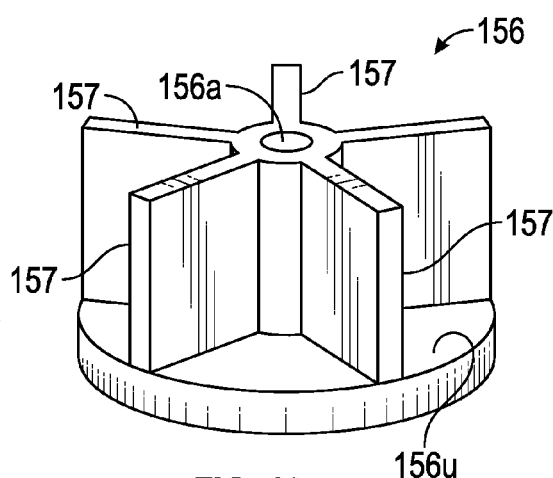
FIG. 18 illustrates a top perspective view of a magnetic impeller useable with the aquarium filtration system showing magnet placement.

FIG. 18 illustrates a top perspective view of the magnetic impeller 156 useable with the aquarium filtration system 100. As shown, the magnetic impeller includes an upper surface 156*u* upon which a plurality of impeller blades 157 are arranged. In operation, the magnetic impeller 156 rotates about an axis 156*a*.

While this invention has been described in conjunction with the various exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. An aquarium filtration system, comprising:
an aquarium having a substantially planar lower surface;
an aquarium support capable of supporting the aquarium atop, the aquarium support having an upper surface which comprises a substantially planar upper surface that is adjacent the lower surface of the aquarium when the aquarium is placed atop the aquarium support, the aquarium support having at least one ventilation opening to provide heat dissipation, the aquarium support including a plurality of spinning magnets disposed therein, the spinning magnets being permanent magnets spun by an electric motor disposed entirely within the aquarium support, wherein the permanent magnets disposed entirely within the aquarium support are disposed on a spinning portion of the electric motor; and
a removable hollow ornament filtration device having a decorative shape and being disposed adjacent to an inner bottom surface of the aquarium, the hollow ornament filtration device comprising a main portion and a base, the main portion detachably interlocking with the base, the hollow ornament filtration device further including:
a single replaceable filter, and
a magnetic impeller magnetically driven by the plurality of spinning magnets disposed in the aquarium support and beneath the magnetic impeller;
wherein, in operation, the impeller draws a portion of water in the aquarium through a top opening of the hollow ornament filtration device, through the filter, and out the at least one lateral opening of the hollow ornament filtration device.

2. The aquarium filtration system of claim 1, wherein the filter is a replaceable filter cartridge.

3. The aquarium filtration system of claim 1, wherein the impeller is disposed in the base.

4. The aquarium filtration system of claim 1, wherein the magnetic impeller includes a first side having a plurality of blades and a second side opposite the first side having a plurality of permanent magnets.

5. The aquarium filtration system of claim 1, wherein the electric motor is an electric fan, or the electric motor includes an electric fan, and the permanent magnets disposed entirely within the aquarium support are disposed on a spinning portion of the electric fan.

6. The aquarium filtration system of claim 5 wherein the electric motor is a CPU cooling fan.

7. The aquarium filtration system of claim 1, wherein there is no electrical connector disposed between the aquarium support and the impeller.

8. The aquarium filtration system of claim 7, wherein the aquarium is a fishbowl, the fishbowl having curved lateral surfaces.

9. The aquarium filtration system of claim 1 wherein the electric motor is a CPU cooling fan.

10. The aquarium filtration system of claim 1 wherein the electric motor is a low voltage DC powered electric motor with a cord that may be plugged into a standard outlet.

11. The aquarium filtration system of claim 1 wherein the electric motor has a cable with a connector attachable to an external AC/DC adapter.

12. The aquarium filtration system of claim 1 wherein the electric motor has a cable with a USB connector allowing connection to a USB compatible device capable of electrically supplying the electric motor.

13. The aquarium filtration system of claim 12 wherein the electric motor has a USB connector allowing connection to a computer.

14. The aquarium filtration system of claim 1 wherein the aquarium support further includes support legs or bumps which slightly raise the aquarium support from a surface on which it is placed, to allow ventilation of air from the at least one ventilation opening.

15. An aquarium filtration system, comprising:
an aquarium support including an upper surface which comprises a substantially planar upper surface, the aquarium support being capable of supporting an aquarium including a substantially planar lower surface atop, the aquarium support including a plurality of spinning magnets disposed therein, the spinning magnets being permanent magnets spun by an electric motor disposed entirely within the aquarium support, wherein the electric motor is an electric fan, or the electric motor includes an electric fan, and the permanent magnets disposed entirely within the aquarium support are disposed on a spinning portion of the electric fan; and a removable hollow ornament filtration device for placement adjacent to an inner bottom surface of the aquarium, the hollow ornament filtration device having a decorative shape and comprising a main portion and a base, the main portion detachably interlocking with the base, the hollow ornament filtration device further including:

a single replaceable filter; and a magnetic impeller magnetically driven by the plurality of spinning magnets disposed in the aquarium support and beneath the magnetic impeller;

wherein, when the aquarium is filled with water, the impeller draws a portion of the water through a top opening of the hollow ornament filtration device, through the filter, and out at least one lateral opening of the hollow ornament filtration device.

16. The aquarium filtration system of claim 15, wherein the hollow ornament filtration device includes the main portion housing the filter and the base housing the impeller, the main portion attachable with the base; and wherein the upper surface of the aquarium support and the lower surface of the aquarium are substantially planar and adjacent one another when the aquarium is placed atop the aquarium support, and there is no electrical connector between the aquarium support and the impeller.

17. The aquarium filtration system of claim 15 wherein the electric motor is a CPU cooling fan.

18. An aquarium filtration system, comprising:

an aquarium including a substantially planar lower surface;

a removable hollow ornament filtration device disposed adjacent to an inner bottom surface of the aquarium, the hollow ornament filtration device having a decorative shape and including:

a single replaceable filter, and a magnetic impeller; and an aquarium support, capable of supporting the aquarium atop, the aquarium support including a substantially planar upper surface;

wherein the substantially planar upper surface of the aquarium support and the substantially planar lower surface of the aquarium are adjacent one another when the aquarium is placed atop the aquarium support, and there is no electrical contact between the aquarium support and any device disposed in or on the aquarium; and wherein, when the aquarium is filled with water, the impeller draws a portion of the water through a top opening of the hollow ornament filtration device, through the filter, and out at least one lateral opening of the hollow ornament filtration device.

* * * * *